(12) United States Patent
Fuller et al.

(10) Patent No.: US 12,548,207 B2
(45) Date of Patent: Feb. 10, 2026

(54) IMMERSIVE INTERACTIVE ENERGY ASSESSMENT

(71) Applicant: Florida Power & Light Company, Juno Beach, FL (US)

(72) Inventors: Kara Fuller, Hobe Sound, FL (US); Quazi Caesar, Miami, FL (US); Lawrence Oks, Palm Beach Gardens, FL (US); Jose Medina, Tequesta, FL (US)

(73) Assignee: Florida Power & Light Company, Juno Beach, FL (US)

( * ) Notice: Subject to any disclaimer, the term of this patent is extended or adjusted under 35 U.S.C. 154(b) by 290 days.

(21) Appl. No.: 18/307,892

(22) Filed: Apr. 27, 2023

(65) Prior Publication Data

US 2024/0312071 A1    Sep. 19, 2024

Related U.S. Application Data

(60) Provisional application No. 63/490,018, filed on Mar. 14, 2023.

(51) Int. Cl.
*G06T 11/00*    (2006.01)
*G06F 3/01*    (2006.01)
(Continued)

(52) U.S. Cl.
CPC .............. *G06T 11/00* (2013.01); *G06F 3/011* (2013.01); *G06F 3/04842* (2013.01);
(Continued)

(58) Field of Classification Search
None
See application file for complete search history.

(56) References Cited

U.S. PATENT DOCUMENTS

| 3,675,204 A | 7/1972 | Miehle et al. |
| 5,086,385 A | 2/1992 | Launey et al. |

(Continued)

FOREIGN PATENT DOCUMENTS

| CN | 107067192 A | 8/2017 |
| JP | 7065646 B2 | 5/2022 |

(Continued)

OTHER PUBLICATIONS

Bekaroo, Enhancing awareness on green consumption of electronic devices: The application of Augmented Reality, Sustainable Energy Technologies and Assessments 30 (2018): 279-291.

(Continued)

*Primary Examiner* — Yanna Wu
(74) *Attorney, Agent, or Firm* — TROUTMAN PEPPER LOCKE LLP; Dustin B. Weeks; Bo Yang

(57) ABSTRACT

Disclosed is a method and system to combine virtual reality techniques with a consumer's real-world space to identify ways to reduce energy consumption and reduce their attendant carbon footprint through an immersive energy assessment. An object is identified that is related to the consumption of energy in the consumer's real-world space, the system is able to present energy information that is specific to that object. This is in contrast to generic information such as an energy star rating. The specific energy information in one example is derived from data from many sources, including smart electric meters, smart appliances, smart home equipment, Internet of thing equipment, smart thermostats, smart speakers, and in-line watt meters.

19 Claims, 13 Drawing Sheets

(51) Int. Cl.
*G06F 3/04842* (2022.01)
*G06Q 50/26* (2012.01)
*G06V 10/774* (2022.01)
*G06V 20/20* (2022.01)

(52) U.S. Cl.
CPC ........... *G06Q 50/26* (2013.01); *G06V 10/774* (2022.01); *G06V 20/20* (2022.01); *G06T 2200/24* (2013.01); *G06T 2210/56* (2013.01)

(56) References Cited

U.S. PATENT DOCUMENTS

| | | | |
|---|---|---|---|
| 5,586,174 | A | 12/1996 | Bogner et al. |
| 6,934,862 | B2 | 8/2005 | Sharood et al. |
| 6,993,417 | B2 | 1/2006 | Osann, Jr. |
| 7,904,209 | B2 | 3/2011 | Podgorney et al. |
| 8,078,431 | B2 | 12/2011 | Brown |
| 8,311,754 | B2 | 11/2012 | Alles |
| 8,442,695 | B2 | 5/2013 | Imes et al. |
| 8,461,725 | B1 | 6/2013 | Stubbs et al. |
| 8,769,140 | B2 | 7/2014 | Chen et al. |
| 8,868,248 | B2 | 10/2014 | Park |
| 9,329,650 | B2 | 5/2016 | Paul et al. |
| 9,453,655 | B2 | 9/2016 | Bruck et al. |
| 9,946,230 | B2 | 4/2018 | Apelker et al. |
| 10,467,354 | B2 | 11/2019 | Beiner |
| 11,435,772 | B2 | 9/2022 | Gupta et al. |
| 2001/0043233 | A1 | 11/2001 | Sato et al. |
| 2008/0071559 | A1 | 3/2008 | Arrasvuori |
| 2008/0229226 | A1 | 9/2008 | Rowbottom et al. |
| 2009/0198384 | A1 | 8/2009 | Ahn |
| 2010/0191487 | A1* | 7/2010 | Rada .......... H02J 3/01 707/E17.014 |
| 2011/0115816 | A1* | 5/2011 | Brackney .......... H05B 47/1965 700/295 |
| 2013/0321637 | A1 | 12/2013 | Frank et al. |
| 2014/0282172 | A1 | 9/2014 | Bull et al. |
| 2015/0130276 | A1 | 5/2015 | McNeill-McCallum et al. |
| 2016/0146866 | A1* | 5/2016 | Houlette ........ G01R 21/133 702/62 |
| 2016/0266594 | A1 | 9/2016 | Kauffman et al. |
| 2019/0109891 | A1* | 4/2019 | Paruchuri ............... H02J 3/007 |
| 2020/0342652 | A1* | 10/2020 | Rowell .................. G06V 10/82 |
| 2022/0410006 | A1* | 12/2022 | Watanabe ............ A63F 13/5258 |

FOREIGN PATENT DOCUMENTS

| | | |
|---|---|---|
| TW | 578146 | 11/1991 |
| WO | 201863206 A2 | 4/2018 |

OTHER PUBLICATIONS

Carneiro, "Comprehensible and interactive visualizations of spatial building data in augmented reality", Computing in Civil Engineering 2019: Visualization, Information Modeling, and Simulation (2019): 79-86.
Kumar, "IoT based monitoring and control of appliances for smart home", 2016 IEEE International Conference on Recent Trends in Electronics, Information Communication Technology (RTEICT). IEEE, 2016.
Galera, "Mobile web energy monitoring system using DFRduino Uno", Procedia Computer Science 124 (2017): 706-713.
Kobuti. "Interactive Home Energy Monitor", (2014).
Sundramoorthy, "DEHEMS: A user-driven domestic energy monitoring system", 2010 Internet of Things (IOT) (2010): 1-8.
Costanza, "Understanding domestic energy consumption through interactive visualisation: a field study" proceedings of the 2012 ACM conference on ubiquitous computing. 2012.
Purmaissur, "Augmented reality computer-vision assisted disaggregated energy monitoring and iot control platform", 2018 International Conference on Intelligent and Innovative Computing Applications (ICONIC). IEEE, 2018.
Ridi, "User interaction event detection in the context of appliance monitoring", 2015 IEEE International Conference on Pervasive Computing and Communication Workshops (PerCom Workshops). IEEE, 2015.
Staake, eMeter: An interactive energy monitor.
Zoha, "Non-intrusive load monitoring approaches for disaggregated energy sensing: A survey", Sensors 12.12 (2012): 16838-16866.
Abubakar, "Application of load monitoring in appliances’ energy management—A review" Renewable and Sustainable Energy Reviews 67 (2017): 235-245.
Authorized Officer Taina Matos, Written Opinion of the International Searching Authority, Jun. 2, 2024.
Authorized Officer Taina Matos, International Search Report, Jul. 14, 2024.

* cited by examiner

IMMERSIVE INTERACTIVE ENERGY ASSESSMENT

CROSS-REFERENCE TO RELATED APPLICATIONS

This application is based upon and claims priority from prior U.S. Provisional Patent Application No. 63/490,018, filed on Mar. 14, 2023, entitled "IMMERSIVE INTERACTIVE ENERGY ASSESSMENT", the entire disclosure of which being herein incorporated by reference in its entirety.

FIELD OF THE DISCLOSURE

The present disclosure generally relates to creating data sets that are suitable for training automated image recognition processes and, more particularly to producing sets of image recognition training images using synthetically generated images.

BACKGROUND

A home energy assessment, also known as a home energy audit, can help a consumer understand the whole picture of their home's energy use, comfort, and safety. An assessment can help the consumer determine how much energy the consumer uses, where the consumer's home is inefficient, and which problem areas and fixes the consumer should prioritize to save energy and improve the comfort of their home.

Home energy assessments are typically performed by a trained professional. The assessment provides a thorough analysis of the consumer's energy use. In addition to a real-world space-by-real-world space examination of the home, a home energy professional may use equipment such as blower doors, infrared cameras, gas leak, and carbon monoxide detectors, moisture meters, and non-toxic smoke pens.

A professional energy assessment can provide a consumer with a roadmap to saving money and improving the comfort of the consumer's home.

Home energy assessments are conducted by professionals that have industry-accepted credentials. Professional energy assessments generally go into great detail to assess the consumer's home's energy use. The professional energy assessor will do a real-world space-by-real-world space examination of the residence and a thorough examination of past utility bills. Many professional energy assessments will include a blower door test and a thermographic scan. Assessors may use equipment to detect sources of energy loss, such as blower doors, infrared cameras, furnace efficiency meters, and surface thermometers.

Through the process, the home assessor will gather information and produce a report including characterizations of the consumer's home and actions the consumer can take to reduce their home's energy use while increasing the comfort of the living space. Common recommendations often include:

Conduct whole-home air sealing to reduce air leakage and drafts
  Add insulations to the consumer's home's attic, foundation, or walls to prevent heat loss.
  Seal and insulate ducts in unconditioned spaces.
  Remove or repair any parts of the home with internal moisture or mold to improve air quality and reduce deterioration.
  Improve the efficiency of heating, cooling, and hot water equipment.
  Install home ventilation, smart thermostats, LEDs, smart power strips, ENERGY STAR appliances, solar photovoltaic, solar hot water, an electric vehicle charger, and other efficient technologies that improve home performance.

The right mix of improvements to the consumer's home will depend on the age and quality of current equipment, the local climate, and the consumer's home energy goals. The first step to determining the appropriate combination and size of equipment for the consumer's home is getting a professional assessment.

A home energy assessment should be the consumer's first step before making energy-saving home improvements, as well as before adding a renewable energy system to the consumer's home.

Moreover, many states have public service commissions to facilitate the efficient provision of safe and reliable utility services. These commissions often require electric utilities to offer energy savings programs and encourage energy efficiency by offering home energy audits.

Today many home energy audits are not comprehensive, and they fail to identify many potential sources of energy inefficiencies. A need exists for a more comprehensive and cost-effective home energy audit.

SUMMARY OF THE INVENTION

The disclosed system builds towards virtualizing the field energy audit experience, as auditors can virtually collaborate in the home with the customer, exploring the home and its appliances to assess energy inefficiencies.

Disclosed is a method to combine virtual reality techniques with a consumer's real-world space to identify ways to reduce energy consumption and reduce their attendant carbon footprint through an immersive energy assessment. Once an object is identified that is related to the consumption of energy in the consumer's real-world space, the system is able to present energy information that is specific to that object. This is in contrast to generic information such as an energy star rating. The specific energy information in one example is derived from data from many sources, including smart electric meters, smart appliances, smart home equipment, Internet of thing equipment, smart thermostats, smart speakers, and in-line watt meters.

The system and method disclosed provides a platform for performing an interactive energy audit. The method begins with accessing at least one image of a real-world space. The image of the real-world space includes accessing a real-world image, a virtual image, or a combination of both. In another example, real-world space includes a 2-D image, a 3-D image from LiDAR, photogrammetry stitching, a generation of a point cloud, infrared frequency range to identify differences in the heat or a combination.

Next, an object related to energy consumption in the image is identified. The identified object is used to access corresponding specific energy information. A virtual reality image or mixed reality image by combining i) at least one computer-generated indicator of specific energy information near each identified object related to energy consumption with ii) the image of the real-world space.

In one example, the object related to energy consumption in the image of the real-world space is identified by receiving input from a user labeling the object related to energy consumption in the image or using image recognition of the object related to energy consumption in the image, or both.

The object related to energy consumption may be HVAC, windows, range hoods, thermostats, doors, structural features, ceilings, HVAC vents, pool pumps, sprinkler pumps, or a combination.

A user selection of one of the computer-generated indicators of specific energy information. In response to receiving the user selection of the computer-generated indicator, the specific energy information corresponding to the identified object related to energy consumption is presented.

The energy specific information for the identified object related to energy consumption may be through a smart electric meter, an appliance, smart home equipment, Internet of thing equipment, smart thermostats, smart speakers, in-line watt meters, or any combination.

In addition to the energy specific information for the identified object related to energy consumption, the presentation may include energy consumption information from one of a manufacturer of the identified object related to energy consumption, information from third parties regarding energy consumption for a model of the identified object related to energy consumption, or a combination. This may be presented by creating another synthetic image combining the specific energy information with the image of the real-world space.

In another example, the platform further includes receiving a user selection of the recommendation indicator. In response to receiving the user selection, the platform presents a recommendation for improving energy savings corresponding to the identified object related to energy consumption. Recommendations for improving energy savings includes tinting windows, turning off fans or lights in an empty real-world space, replacing lights, identifying air leaks around windows, doors, vents, through ceilings, or a combination thereof. These recommendations may be presented by overlaying on the image of the real-world space a photorealistic image of a replacement object.

Another aspect of the invention includes performing an interactive energy assessment by first analyzing power consumption to identify a first appliance type and develop a first power profile. Next, the power consumption is analyzed to identify a second appliance type and develop a second power profile. Imagery is collected with a portable device having a camera and a display from a premise with a first appliance type. The imagery is analyzed to identify an image corresponding to the first appliance types. Once identified, the first power profile is presented on the display.

Next, the portable device is moved around the premise to collect additional imagery from the premise. The additional imagery is analyzed to identify an image corresponding to the second appliance type. The second power profile is presented on the display.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
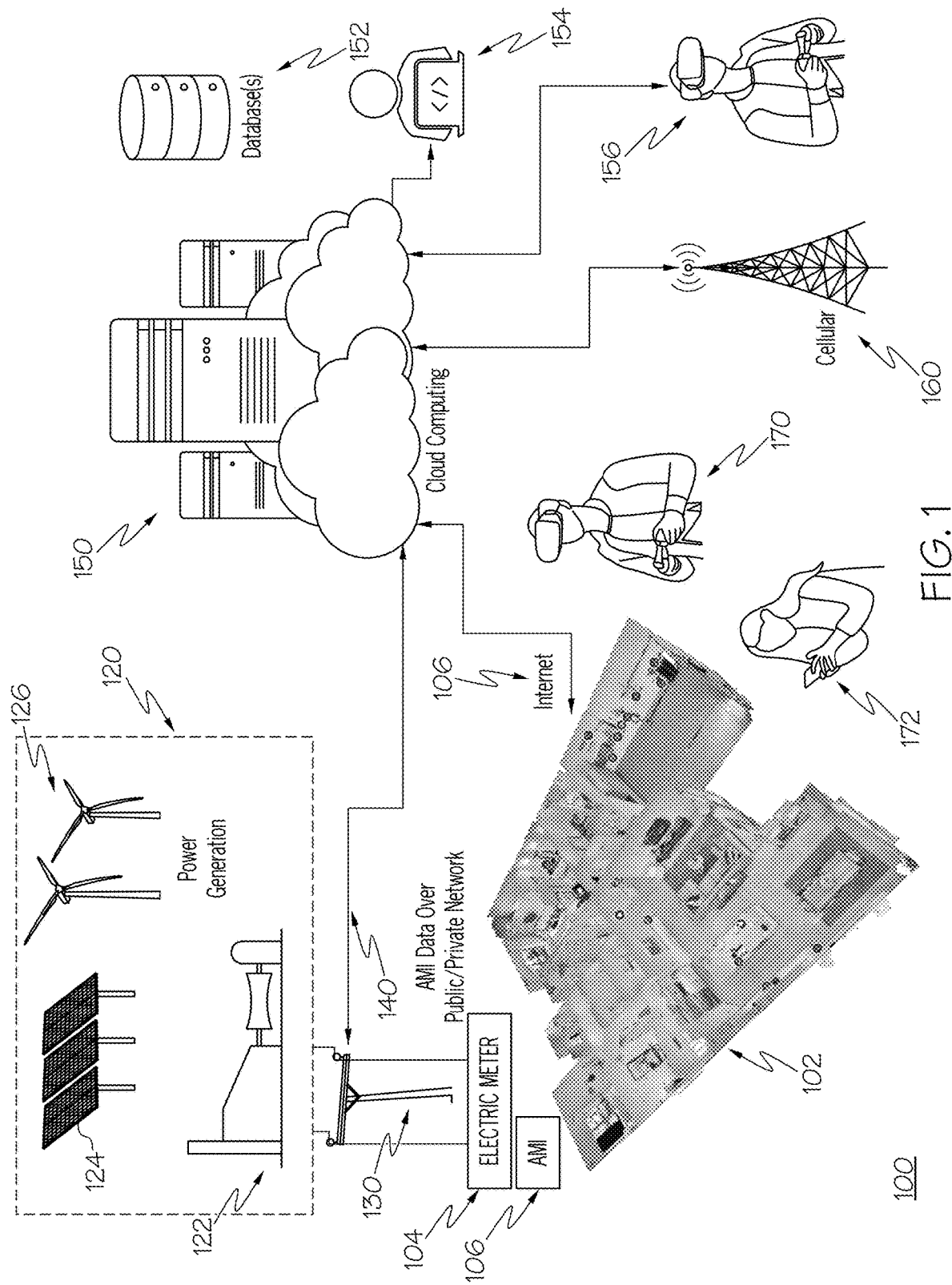
FIG. 1 illustrates an equipment image capture environment, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather to provide an understandable description.

Non-Limiting Definitions

The term "3-D measurements" are measurements, typically non-contact measurements, taken of an object to create a 3-D point cloud of an object that is dimensionally accurate and a photorealistic model of the object, such as through photogrammetry.

The terms "a" or "an", as used herein, are defined as one or more than one. The term plurality, as used herein, is defined as two or more than two.

The term "adapted to" describes the hardware, software, or a combination of hardware and software that is capable of, able to accommodate, to make, or that is suitable to carry out a given function.

The term "another", as used herein, is defined as at least a second or more.

The term "class" or "classifier" or "label" is a class label applied to data input in a machine learning algorithm.

The term "configured to" describes hardware, software or a combination of hardware and software that is adapted to, set up, arranged, built, composed, constructed, designed, or that has any combination of these characteristics to carry out a given function.

The terms "camera" and "displays" are terms of convenience but do nevertheless describe an ordinary cell phone. A camera can be expanded to include any form of directional identification of the appliance-Optics, LiDAR, RFID, NFC, etc. and the display can be a cell phone with or without displaying augmentation of the appliance, or a hand-held or head-worn stereoscopic display. Also, the information displayed can include both smart meter and cloud-based appliance information.

The term "computer-generated image" means image content brought into a real-world image to augment it.

The term "coupled," as used herein, is defined as "connected," although not necessarily directly, and not necessarily mechanically.

The term "energy consumption" as used herein, means related to the use of energy sources, including electricity, natural gas, oil, and includes both renewable and non-renewal sources of energy. Energy consumption can be specific to a device being viewed or generic such as information that is applicable to all similar make and model numbers.

The term "extended reality" is an umbrella term for all immersive technologies, including augmented reality (AR), virtual reality (VR), and mixed reality (MR).

The term "generic energy information" means general energy information, typically from a manufacturer or other agency for a given family or model of objects related to energy savings.

The terms "including" and "having," as used herein, are defined as comprising (i.e., open language).

The term "image" refers to a spatial pattern of physical light comprised of known colors of the light spectrum, which may or may not be visible to the human eye. The term image includes both real-world images, such as a live view through a camera, as well as a virtual representation of a space.

The term "image editing software" means software for editing and manipulating images, such as, Blender.org or Photoshop from Adobe.

The term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The term "object related to energy consumption" means insulation in walls, attic, foundation, hot water equipment, ventilation, smart thermostats, LEDs, smart power strips, appliances, solar hot water, solar photoelectric, electric vehicle chargers, window tint, replacement windows, and other energy-efficient technologies that improve energy savings and provide a reduction in a carbon footprint.

The term "photogrammetry" is a technique to extract three-dimensional measurements of an object for obtaining reliable information, such as three-dimensional measurements, through processing and interpreting a series of photographic images. Photogrammetry may be complemented by techniques like LiDAR, laser scanners (using time of flight, triangulation or interferometry), white-light digitizers and any other technique that scans an area and returns x, y, z coordinates for multiple discrete points, commonly called "point clouds".

The term "real-world" means existing in reality, as opposed to one that is virtual, imaginary, simulated, theoretical or a computer-generated image.

The term "specific energy information" means energy information measured, whether real-time or historical data, and whether directly or inferred through a smart meter, for specific objects related to energy savings in a real-world space, typically appliances and other items or objects related to energy consumption.

The term "synthetic" means creating a computer-generated composite image combining computer-generated images with real-world images.

The term "variable attributes" means a changeable characteristic of a specific object in a family of objects that may be different from other objects in the same family of objects.

The term "uniform data format" means data in a given format, whether date format, time format, currency format, scientific format, text format, or fractional format, so that all values of data are presented in a single consistent format for a given category or criteria.

It should be understood that the steps of the methods set forth herein are not necessarily required to be performed in the order described, and the order of the steps of such methods should be understood to be merely exemplary. Likewise, additional steps may be included in such methods, and certain steps may be omitted or combined in methods consistent with various embodiments of the present device.

Overview

Disclosed is a method to combine virtual reality techniques with a consumer's real-world space to identify ways to reduce energy consumption and reduce their attendant carbon footprint through an immersive energy assessment.

Once an object is identified that is related to the consumption of energy in the consumer's real-world space, the system is able to present energy information that is specific to that object. This is in contrast to generic information such as an energy star rating. The specific energy information in one example is derived from data from many sources, including smart electric meters, smart appliances, smart home equipment, Internet of thing equipment, smart thermostats, smart speakers, and in-line watt meters.

In one example, in a house with a washing machine and a microwave, the smart meter may identify the washing machine by long rhythmic power consumption and the microwave by short and high start currents. Then the camera would identify a specific washing machine, microwave manufacturer, and model number through a "Google Lens" type process. The invention then generalizes the manufacturer and model number information to an appliance type and then matches the smart meter-determined appliance type to display the corresponding power profile information.

The disclosed system builds towards virtualizing the field energy audit experience, as auditors can virtually collaborate in the home with the customer, exploring the home and its appliances to assess energy inefficiencies.

Operating Environment

FIG. 1 shows one example of an operating environment 100 for performing an interactive energy assessment, includes an electrical power "grid" that is used to provide electrical power to consumer premises 102. The example shown in FIG. 1 depicts a number of examples of power generation components 120. Illustrated is a combined cycle gas generator 122, a solar array farm 124, and a wind farm 126. In further examples, operational contexts are able to include one power generation component, multiple collocated power generation components, power generation components that are physically separated and supply a common electrical power transmission or distribution system, any one or more power generation components, or combinations of these. These power generation components are able to be of any suitable type or design.

In this example, electrical power generated by one or more power generation components is provided to a power transmission system 130. The illustrated example depicts a transmission connection 130 that couples one or more sources within power generation components 120 to the consumer's premises 102. For simplicity, not shown as part of the transmission connection 130 are additional known transmission equipment, such as, suitable step-up transformers and long-distance transmission lines to convey the generated electrical power to remote power distribution networks, other electrical power consumers. A smart electric meter 104 is electrically coupled to the transmission connection 130 for the consumer's premises, as shown. In one example, the smart electric meter 104 is also electrically coupled to an advance metering network (AMI) 140.

The electric meter 104 may include an AMI module 106 and a consumer's premises 102 interconnected through a smart grid, for example. In one embodiment, the AMI customer portal 154 provides customers with tools that allow a comparison of monthly, daily, and hourly periods of energy usage through a cloud computing platform 150. The customers may be able to access the data from a repository 152 on a real-time basis through the use of a wired network 106 or wireless network 160. Alternatively, the data may be accessed in a near-real-time manner. The data may be collected by the AMI module 106 from a plurality of sources and then transmitted through the use of network 140 to the data repository 152. For example, the data may be collected from smart meters, Home Area Network (HAN) pricing 102, or any other component of the AMI. The system may also provide customers with analytical tools. The analytical tools may be for at least a graphical, a tabular, a numerical analysis, or the like of the customer's anticipated energy usage and generation data. The system may also provide the customers with an analytical tool for at least a graphical, tabular, numerical analysis, or the like of the customer's historical energy usage and energy generation data.

Optionally, the system may also have a plurality of widgets customized and/or customizable for individual customers. For example, the widgets may be customized based on the customer profile, i.e., the type of energy sources, the usage data, the customer's preferences as to the usage of electricity, the customer's monitored usage habits, energy consumption data of the community where the customer is located, and the like. A user can have different user accounts, and each account can have a different profile. Also, a meter may be inquired remotely to see if power is down at the meter and not inside a customer's home. Thus, one customer may have a plurality of customized profiles, from which a customer may select a profile to apply at any given time. Additionally, the customer may be able to manage or communicate with individual electric appliances.

In one example, these systems may include hardware, software, communications interfaces, consumer energy displays and controllers, customer-associated systems, Meter Data Management (MDM) software, supplier business systems, and the like. In one embodiment, the system may be hardware-based, or software-based, or any combination thereof.

Individual customer profiles may also show usage/consumption data that closely matches the usage information that will be sent to the customer in a bill. The subject matter disclosed herein enables a framework that helps the development of widgets that are reusable and extendable. The subject matter disclosed herein may also enable a replicable portal that allows the addition of widgets. In one embodiment, a customer may be a residential user. Optionally, the customer may be a commercial user. A network may be a wired network or a wireless network 160.

Also shown are two power customers, 170 and 172. Power customer 170 is using a virtual reality headset to provide an immersive interactive energy assessment. Power customer 172 is shown using a smartphone to provide an immersive interactive energy assessment, as further described below. The customers may be guided by an energy auditor 156 that is in the same virtual space of the customer premises 102 space but geographically separate. The energy auditor 156 can be a person using virtual reality headsets or other displays like a smartphone or computer. The energy auditor 156 guides customers 170 and 172 through the customer's premises 102 to conduct the immersive interactive energy assessment.

In another example, the energy auditor 156 is an avatar that is programmatically created to guide customers 170 and 172 through the customer's premises 102. Tools to create avatars are available for free and purchase on platforms such as GitHub and Crunchbase.

In general customer premises 102 coupled to the power distribution system 120 and are able to include any combination of residential, commercial or industrial buildings.

Immersive Environment

Figure 2:
FIG. 2 is an image of a top perspective view of a real-world residential space, according to an example.

Turning now to FIG. 2, shown is image 200 of a top perspective view of a real-world residential space. This image may be rendered to power customers 170 and 172 as shown in FIG. 1. This image 200 can be a real-world image, a virtual image or a combination. Typically the image 200 is captured using a 3-D image from LiDAR, photogrammetry stitching, or the generation of a point cloud. Another example, accessing images in an infrared frequency range to identify differences in heat. The images may be captured by power customers 170 and 172 using cameras, such as smartphone cameras, or via a third-party system.

Shown in this perspective view is a collection of computer-generated indicator (shown in blue) of specific energy information. These computer-generated indicators are generated by identifying objects in the image 100 related to energy consumption, includes appliances, HVAC, windows, range hoods, thermostats, doors, structural features, ceilings, HVAC vents, pool pumps, sprinkler pumps (switches, appliances, thermostats, windows, lights, or combinations. The objects identified can be identified based on receiving input from a user labeling the object related to energy consumption in the image. The user input can be text, voice, including speech to text recognition, or a combination thereof. In another example, the image recognition of the object related to energy consumption in the image. Google Lens, Microsoft Lens, Greenshot, TinEye, and others are an example of image recognition technology. This will also be discussed further below in the section entitled "Overall Flow Diagram of Immersive Energy Assessment". Further, the consumer may be given awards or incentives to label objects related to energy consumption.

These identified objects are used to access corresponding specific energy information. The specific energy information can be accessed from smart electric meters, appliances, smart home equipment, Internet of thing equipment, smart thermostats, smart speakers, in-line watt meters, and more.

The computer-generated indicators (in blue) are positioned within the image 200 to create a virtual reality image or mixed reality image by combining i) at least one computer-generated indicator of specific energy information near each identified object related to energy consumption with ii) the image of the real-world space.

Figure 3:
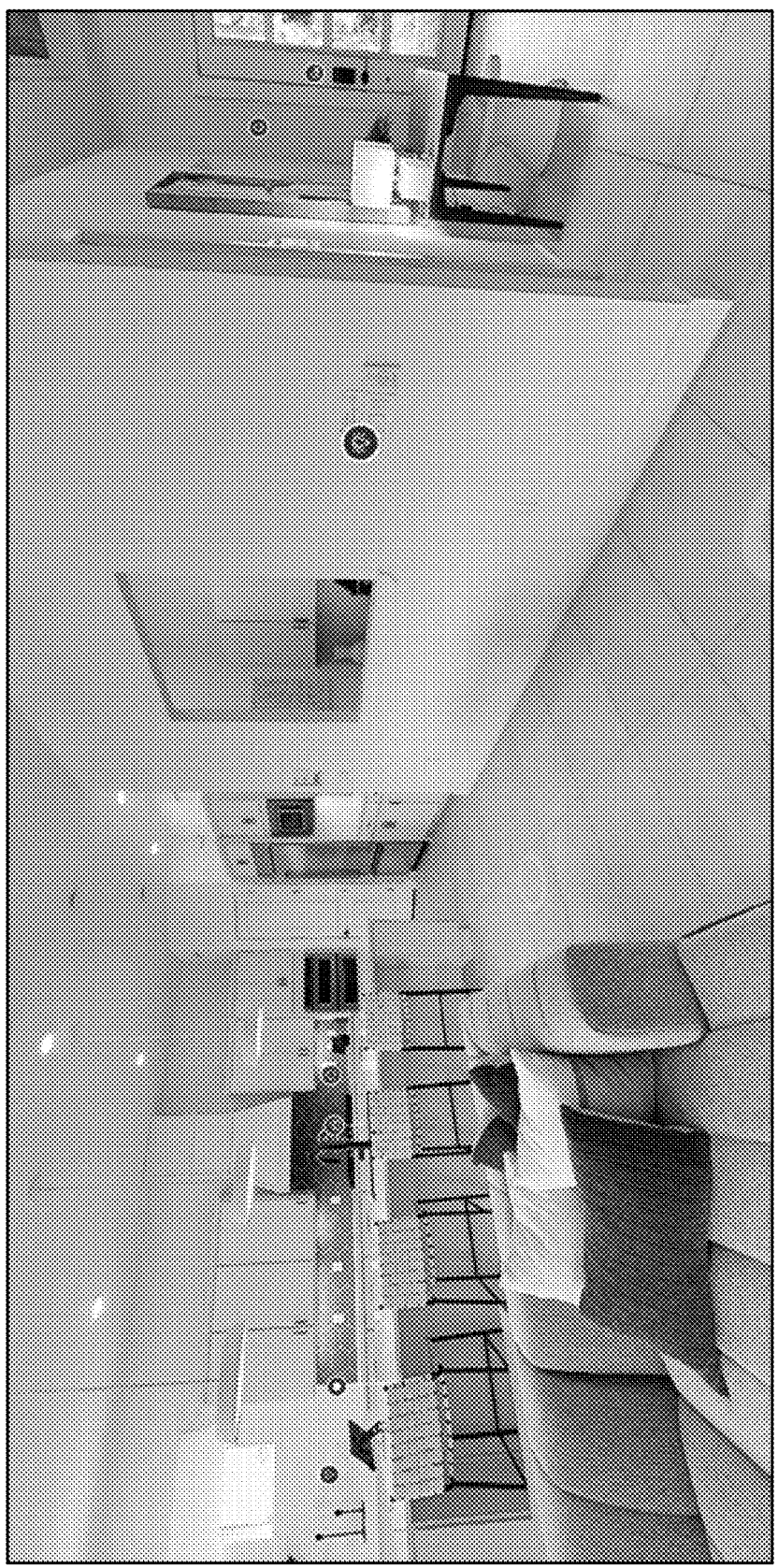
FIG. 3 is a more detailed image of a kitchen area in FIG. 2, illustrating the identified objects with the computer-generated indicators (in blue) in the virtual reality image, according to an example.

FIG. 3 is an image of a more detailed view of a kitchen area in FIG. 2, illustrating the identified objects with the computer-generated indicators (in blue) in the virtual reality image.

Figure 4:
FIG. 4 is another image of the kitchen area in FIG. 3 illustrating the identified object as a refrigerator, according to an example.

FIG. 4 is another image of the kitchen area in FIG. 3 illustrating the identified object as a refrigerator. Shown is a computer-generated hand, i.e., a user selection in the process of selecting a computer-generated indicator of specific energy information. Illustrated in FIG. 4 in response to the user selection of the computer-generated indicator is a presentation of the specific energy information corresponding to the identified object, i.e., the refrigerator, related to energy consumption. Shown here are the real-time amount of wattage being consumed i.e., 99 Watts, and the percentage of the real-time household energy consumption, i.e., 0.8%. In this example, the specific energy information corresponding to the identified object, i.e., refrigerator, includes creating another synthetic image by combining the specific energy information with the real-world image of the real-world space.

In addition to the specific energy information being displayed, in another example, generic energy information from one of a manufacturer of the identified object related to energy consumption is displayed (Not shown).

Also, in lieu of, or in addition to, information from other parties, such as Government websites, Consumer reporting agencies, this party testing agencies regarding energy consumption for a model of the identified object related to energy consumption.

Figure 5:
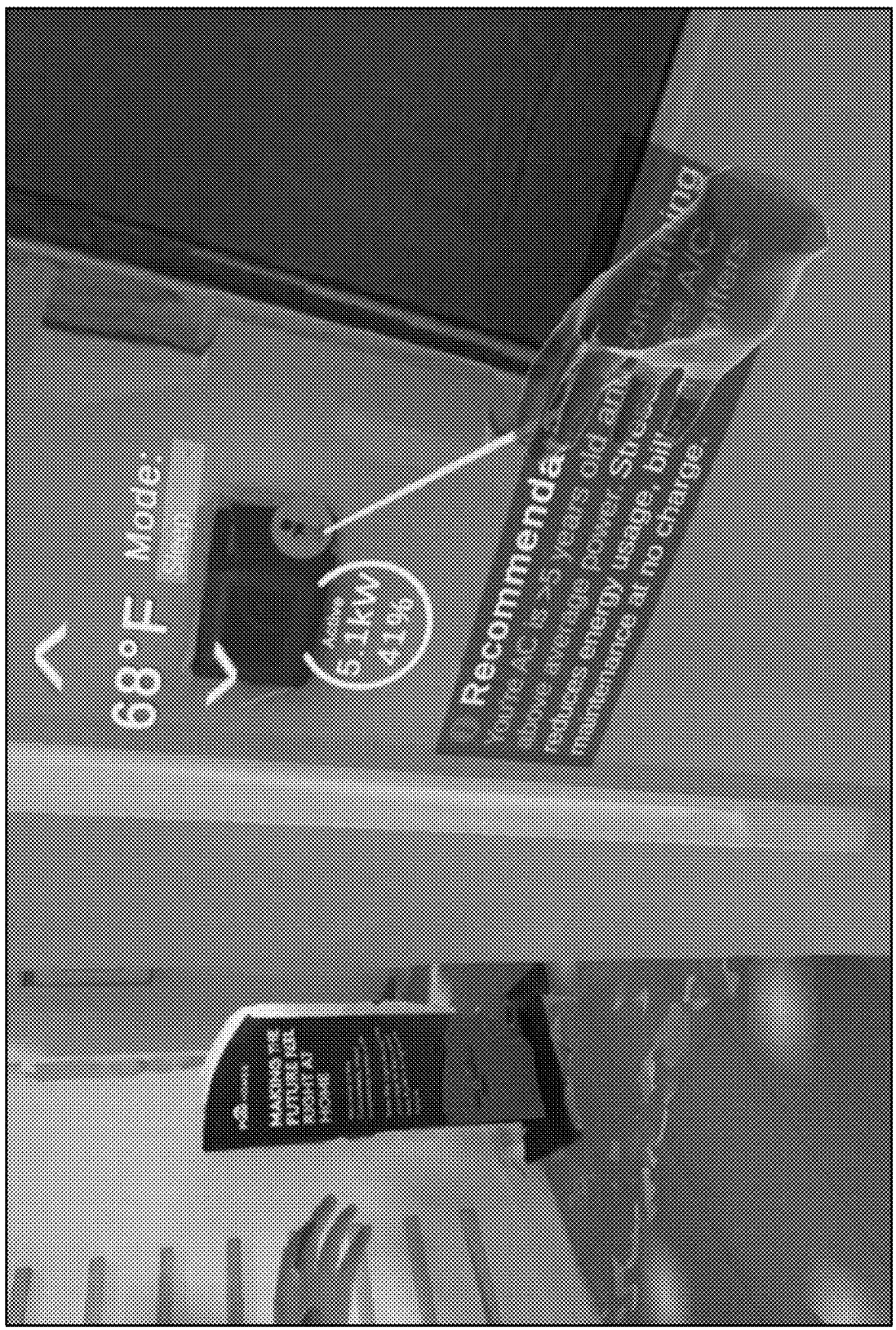
FIG. 5 is an image of a hallway area in FIG. 2 illustrating the identified object as an HVAC thermostat, according to an example.

FIG. 5 is an image of a hallway area in FIG. 2, illustrating the identified object as an HVAC thermostat. Shown here are the real-time amount of wattage being consumed, i.e., 5.1 kWatts, and the percentage of the real-time household energy consumption, i.e., 41%.

In addition, a recommendation is shown. Here the recommendation includes "You're AC is 5 Years old and consuming above-average power." The recommendation continues with a specific service "Stress-Free AC reduced energy usage, bills, and offers maintenance at no charge." In this example, the recommendation corresponding to the identified object, i.e., thermostat, includes creating another synthetic image by combining the specific energy information with the real-world image of the real-world space.

In one example, the recommendation is automatically presented with specific energy information. In another example, an additional computer-generated indicator, such as the "i" (in green) for "Information," is presented. Once the user in the virtual environment selects this "i" the recommendation on improving energy efficiency is presented.

Figure 6:
FIG. 6 is an image of a laundry room area in FIG. 2 illustrating the identified object as a clothes washer and dryer, according to an example.

FIG. 6 is an image of a laundry room area in FIG. 2 illustrating the identified object as a clothes washer and dryer. Shown here are the real-time amount of wattage being consumed, i.e., 462 Watts, and the percentage of the real-time household energy consumption, i.e., 3.8% for the electric dryer and 37 W and 0.1% for the washer.

Figure 7:
FIG. 7 is an image of a garage area in FIG. 2 illustrating the identified object as an electric vehicle (EV) charger, according to an example.

FIG. 7 is an image of a garage area in FIG. 2 illustrating the identified object as an electric vehicle (EV) charger. Shown here are the real-time amount of wattage being consumed, i.e., 3.7 kWatts, and the percentage of the real-time household energy consumption, i.e., 29%. FIG. 6 also has the specific energy information historical data over the last 31 days with a total of 379 k Watts at the cost of $82.

Also shown in FIG. 7 is the "i" additional information indicator (green) and the recommendations. Here the recommendation states, "You are paying above average rates for EV charging. FPL Evolution Home allows unlimited night and weekend charging for one low monthly cost." There is another recommendation "Charge my EV whenever there is excess solar."

Other additional information may include presenting the recommendation for improving energy savings, includes one of the tinting windows, turning off fans or lights in an empty real-world space, replacing lights, identifying air leaks around windows, doors, vents, through ceilings, and more.

The additional information may include overlaying on the real-world image a photorealistic image of a replacement object, such as tinting on windows.

Figure 8:
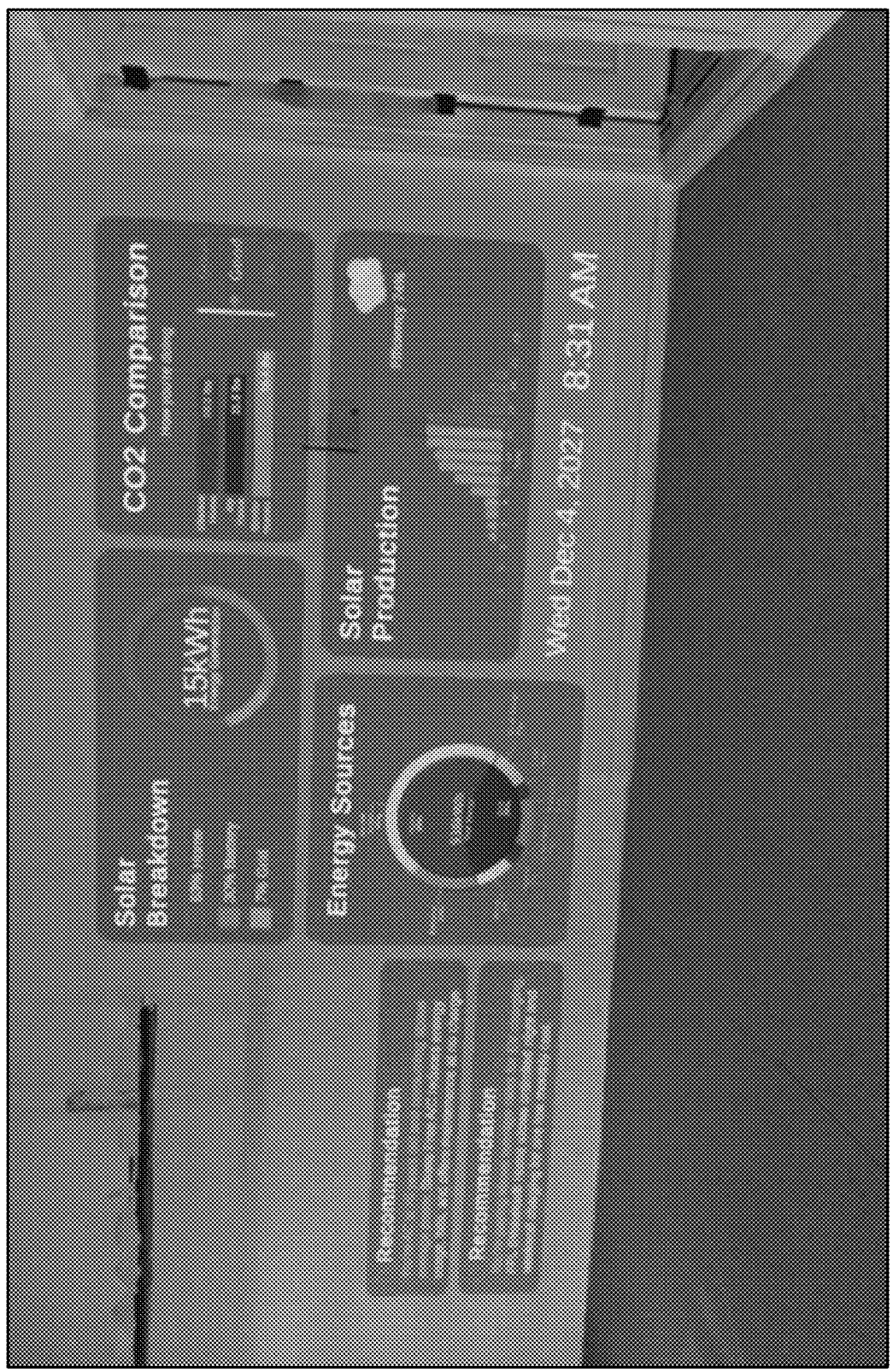
FIG. 8 is an image of a garage area in FIG. 2 illustrating the identified object as a photovoltaic solar and storage battery, according to an example.

FIG. 8 is an image of a garage area in FIG. 2 illustrating the identified object as a photovoltaic solar and storage battery. Shown here is the solar breakdown of how much of the solar is being consumed by the home 63% and being stored in the battery 30% and sent back to the grid 7%. Other information includes solar production, $CO_2$ comparison, energy sources, and along with recommendations.

Overall Flow Diagram of Immersive Energy Assessment

Figure 9A:
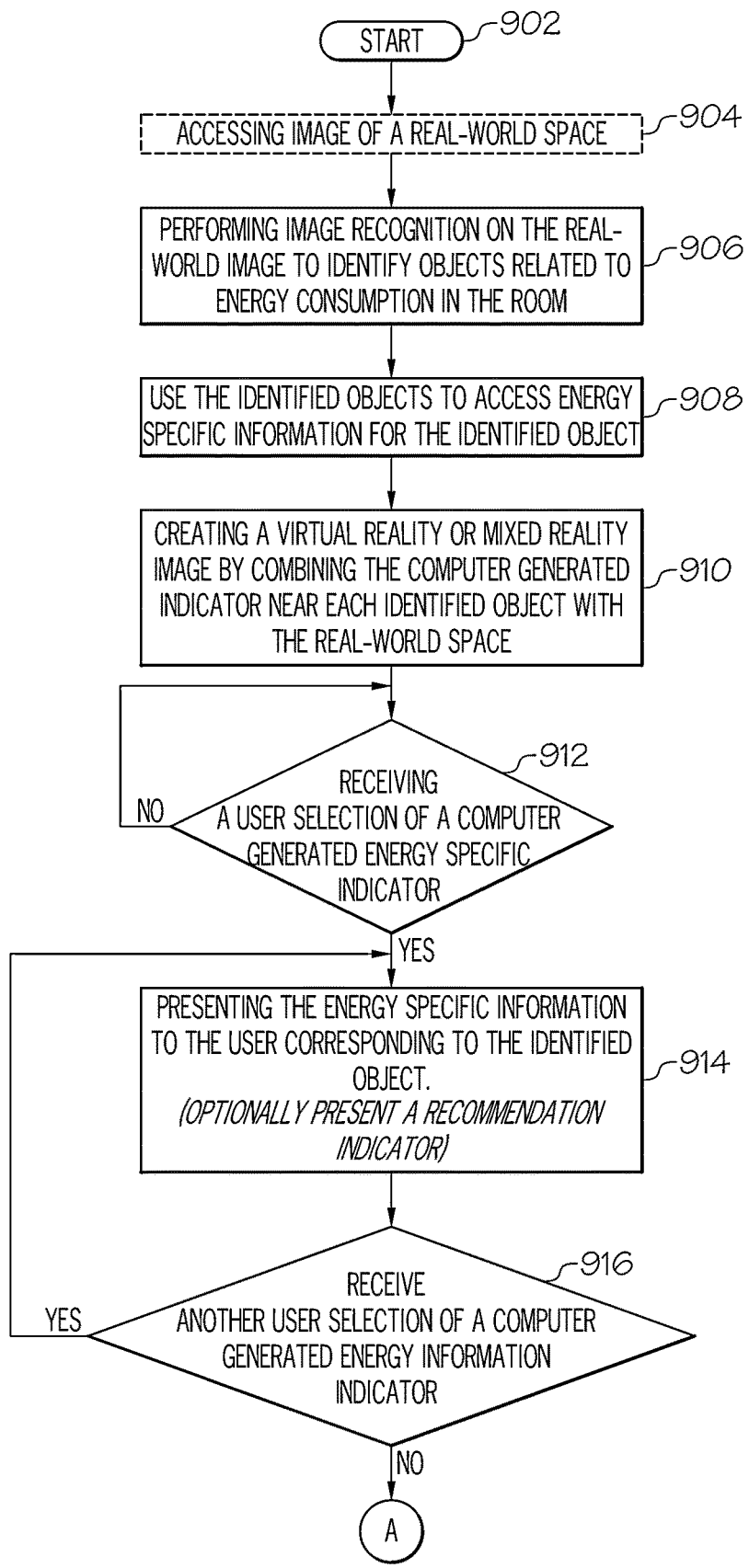
FIG. 9 illustrates a process flow of an immersive interactive energy assessment, according to an example.
Figure 9B:
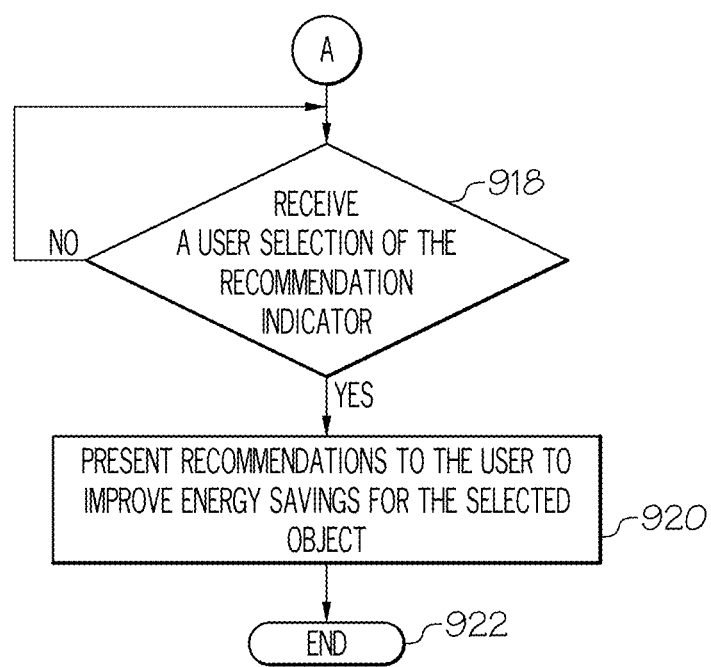
Figure 10:
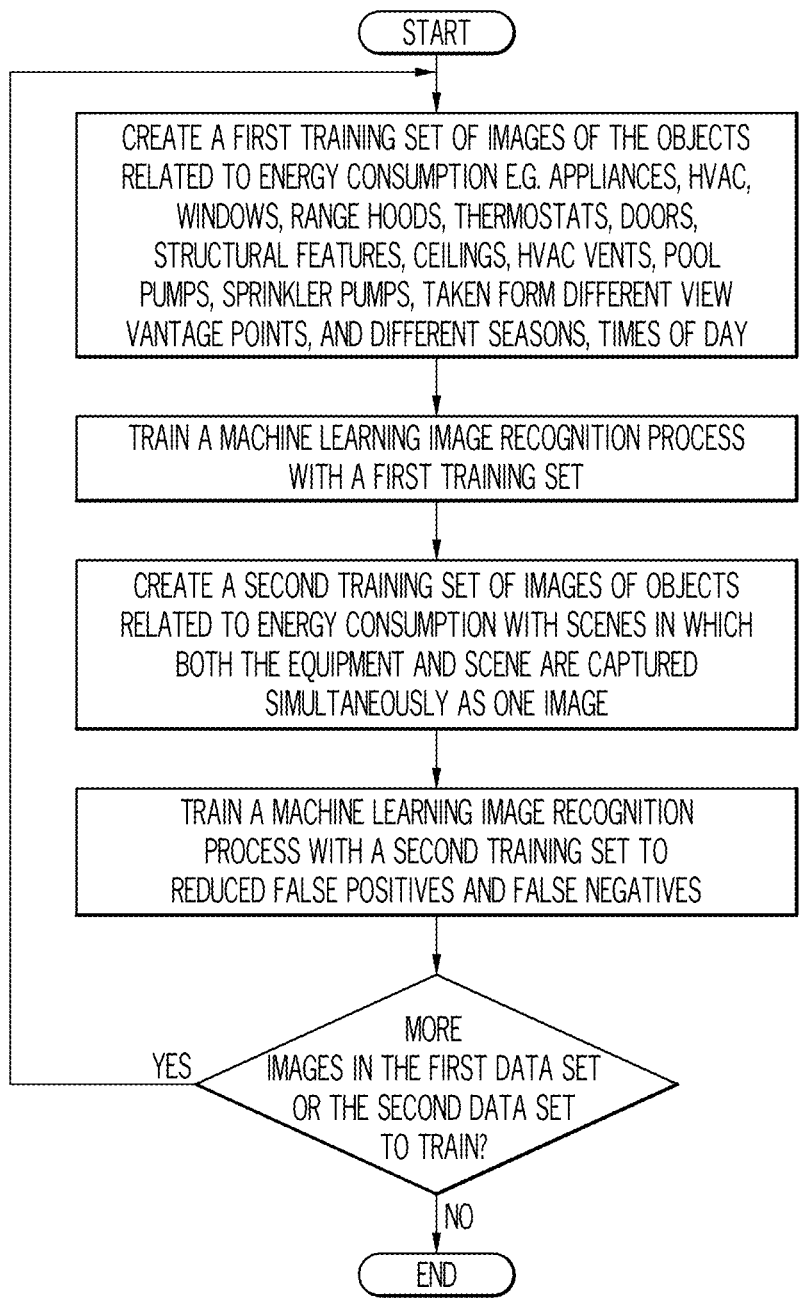
FIG. 10 illustrates a process flow of machine learning image training set creation, according to an example.

Referring now to the flow diagram in FIG. 9, the present invention uses augmented reality techniques to capture real-world images of a real-world space. The process begins in step 902 and immediately proceeds to step 904 to access real-world space. In one example, the capture is two-dimensional, and in other examples, the capture uses LiDAR, photogrammetry stitching, or other methods for determining ranges through the generation of a point cloud, such as with Pix4d.com software. These images may be captured with a smartphone or with cameras.

Moreover, image capture can include non-visible wavelengths of light, including infrared, to assist with the detection of heat loss and sources of heat generation. The process continues to step 906.

Next in step 906, image recognition is performed to identify objects related to energy consumption. These objects can include appliances, HVAC, windows, range hoods, thermostats, doors, and other structural features, ceilings, HVAC vents, pool pumps, and sprinkler pumps. Examples of image recognition is Google Lens, Bixby Vision, Huawei Hi Vision and others. The location, i.e., the x,y,z coordinates of these objects in the real-world image, are also stored. The process continues to step 908.

Next in step 908, for objects that have been identified as related to energy, specific energy information is gathered from many different sources. The information can be accessed from one of a smart electric meter, an appliance, smart home equipment, Internet of thing equipment, smart thermostats, smart speakers, in-line watt meters, home energy monitor equipment, such as those available from Sense.com or any combination thereof. The system could also instruct the user to turn on or off certain items in their house to better quantify energy consumed by a targeted appliance. Optionally, geographic location, weather, and orientation of a real-world space with respect to the sun may also influence the specific energy information. The energy consumption from non-renewal energy sources defines a carbon footprint for real-world space.

In one example, a smart meter combined with AI analyzes the power consumption at a customer's location to categorize consumption by load/appliance. The consumption may be real-time or historic. The Augmented reality device then visually recognizes a load/appliance category at the premises with a different AI process. Then the smart meter data categorization is automatically selected for the recognized load/appliance based on the visually determined AI category matching the smart meter AI-determined category.

Optionally, generic energy-related information may also be accessed. This generic energy information may be accessed from one of a manufacturer and information from third parties regarding energy consumption for a model, e.g., Energy Star information. The process continues to step 910.

Next in step 910, for objects that have been identified as related to energy, a computer-generated indicator is generated and positioned near each of the objects to denote that specific energy-related information is available. In one example, the 3-D rendering of the real-world image, i.e., physical space, allows users to pan through the real-world space to visualize the carbon/energy inefficiency score associated with key points of interest in their real-world space. Panning can be accomplished through a variety of platforms, including a web or cellphone app (manual panning/paging) or through immersive virtual rendering available for use with a virtual reality headset. The process continues to step 914 otherwise, if no selection is received the process loops back to start step 912 as shown.

In response to a user selecting the computer-generated indicator, step 914, the system presents the specific energy-related. Optionally, generic energy information or energy consumption information may also be presented. Further, a recommendation indicator may also be presented. The process continues to step 916.

In step 916, if another user selection of a computer generated energy information is received, the process continues and loops to step 914 as shown. Otherwise the process continues to step 918.

In response to a user selecting the recommendation indicator in step 918, the system presents the recommendation to reduce energy consumption in step 920 and completes in step 922. The recommendation may be putting tinting on windows, placing foliage outside, turning off fans or lights running in an empty real-world space, to replacing incandescent lights with LED lights, and identifying air leaks around windows, doors, vents, and through ceilings.

In one example, AI-assisted recommendations of strategies and solutions to improve the energy consumption and carbon/inefficiency-score throughout the real-world space is provided. Further, recommendations can be selected and placed in a virtual "basket" that in turn can be used to request follow-up sales/service calls to be addressed by technicians/associates or affiliates.

In another example, the system overlays a photorealistic addition. For example, window tinting may be applied over the real-world image of the window. Outside foliage is recommended and presented. Image effects of photography/videography such as lighting, color, luminesce, reflectance, etc., may be applied. Further, the orientation of the window versus the sun may be determined by many means, including metadata, GPS from the image, light patterns through the window and through user input.

Another example is replacing a current washer and dryer with an energy-efficient washer and dryer. The system may overlay a photorealistic image of the replacement washer and dryer to give the user an understanding of how the end results may look. In addition, recommendations on where to purchase the replacement appliance and recommendations for installation may also be included.

In another example, the user may turn on/off an identified object related to energy consumption, for example, the washer and dryer. This may help to understand the amount of energy used in real-time when disaggregating energy consumption from a smart meter. The identified object is controlled as an internet of things (IoT) device. Another example is a smart thermostat, such as, a Next thermostat, which is an IoT device that can be remotely controlled over the Internet, not just turned on or off but set to a specific temperature to measure heating or cooling energy consumption.

This ability to turn on/off the identified object related to energy if it does not connect as an IoT device could be simulated based on the manufacturer's specification and whether age or condition (e.g. an AC unit) needs to be taken into account for efficiency. This energy information is presented to the user.

The overlaying of photorealistic images includes inserting, with image editing software, the replacement washer and dryer that uses resizing transformation to be consistent with the scene.

Coupons, discounts, partnerships, and energy rebates be presented along with the recommendations.

Budgets may also be set so that recommendations are ranked in terms of the highest energy savings for the lowest cost to stay within a consumer's budget. Stated differently, potential energy savings and carbon/energy inefficiency, and energy recommendations can be optimized for budgets. With all available carbon/energy inefficiency recommendations in hand, customers can experiment with the best allocation of their investment by allowing them to enter their budget and automatically calculate the best places to invest in optimizing carbon/efficiency. Further, a what-if tool allows the user to evaluate what the optimum carbon/energy efficiency improvements might be for any given disposable budget and estimated energy bill savings.

The goal to reduce energy consumption and reduced a carbon footprint can be "gamified" to allow consumers to publish their carbon/efficiency score on social media or in the virtual space they use to interact with friends and family (i.e. Facebook, Instagram, Tiktok, Roblox. Sandbox.com and more) with before/after story-lines.

Image 1 portrays the concept of virtually exploring a digital twin of the customer's home, in which they can see possible appliances, thermostats, and more are tagged in the virtual space. Customers can move about the space and visualize carbon efficiency scores related to items in the home based on disaggregated energy data we capture, mixed with imagery and characteristics captured.

Image 2 portrays the deliverable of step 1. in which the customer captures comprehensive imagery of the home using LIDAR or photogrammetry—with a device such as a modern smartphone. This enables two further steps:

A digital twin to be created of the customer's home, a virtual space that can be explored in the metaverse and potentially collaborated in with a virtual energy auditor.

Object detection and recognition allows the system to gather data and characteristics about the home and the energy efficiency of appliances and other parts of the home, such as windows, lighting fixtures, HVAC systems, and more.

Flow Diagram of Object Related to Energy Consumption

Figure 11:
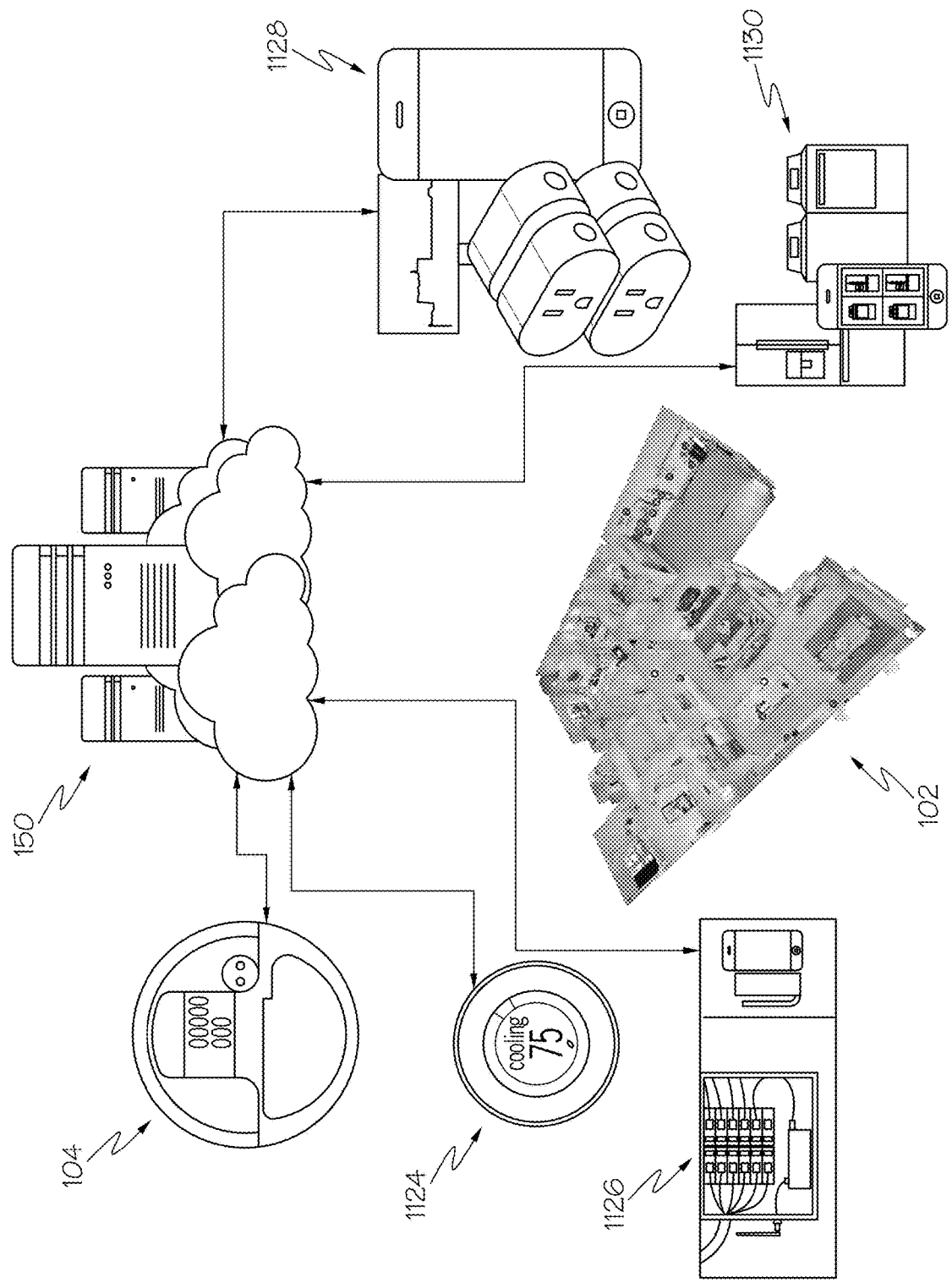
FIG. 11 illustrates a block diagram of various methods of accessing specific energy information from an object related to energy consumption, according to an example.

Turning now to FIG. 11, illustrated is a block diagram 1100 various methods of accessing specific energy information from an object related to energy consumption, according to an example. Customer premises 102, smart electric meter 104, such as those available from General Electric and others, and cloud computing platform 150 have been previously described above with reference to FIG. 1.

In addition to the smart electric meter 104, the other methods to access specific energy information for an identified object related to energy consumption includes smart appliances 1130, such as, washer, dryer, and refrigerator, which report their real-time or current energy usage. Also shown are smart plugs 1128 from Emporia Corps of Littleton Colorado, which monitor the energy usage of an object that is plugged into it.

Continuing further, a smart thermostat 1124, such as Google's Nest or others, can report energy consumption from an HVAC system or systems. And home energy monitors 1126 such as those available from Sense Labs, Inc of Cambridge, Massachusetts, and others, can report energy usage for a specific object in a household.

Devices that monitor energy usage, as shown in FIG. 11 can communicate back to the cloud computing site 150 of FIG. 1 using the public/private network 140 of through a wireless connection 160 or both.

Computer Hardware

Figure 12:
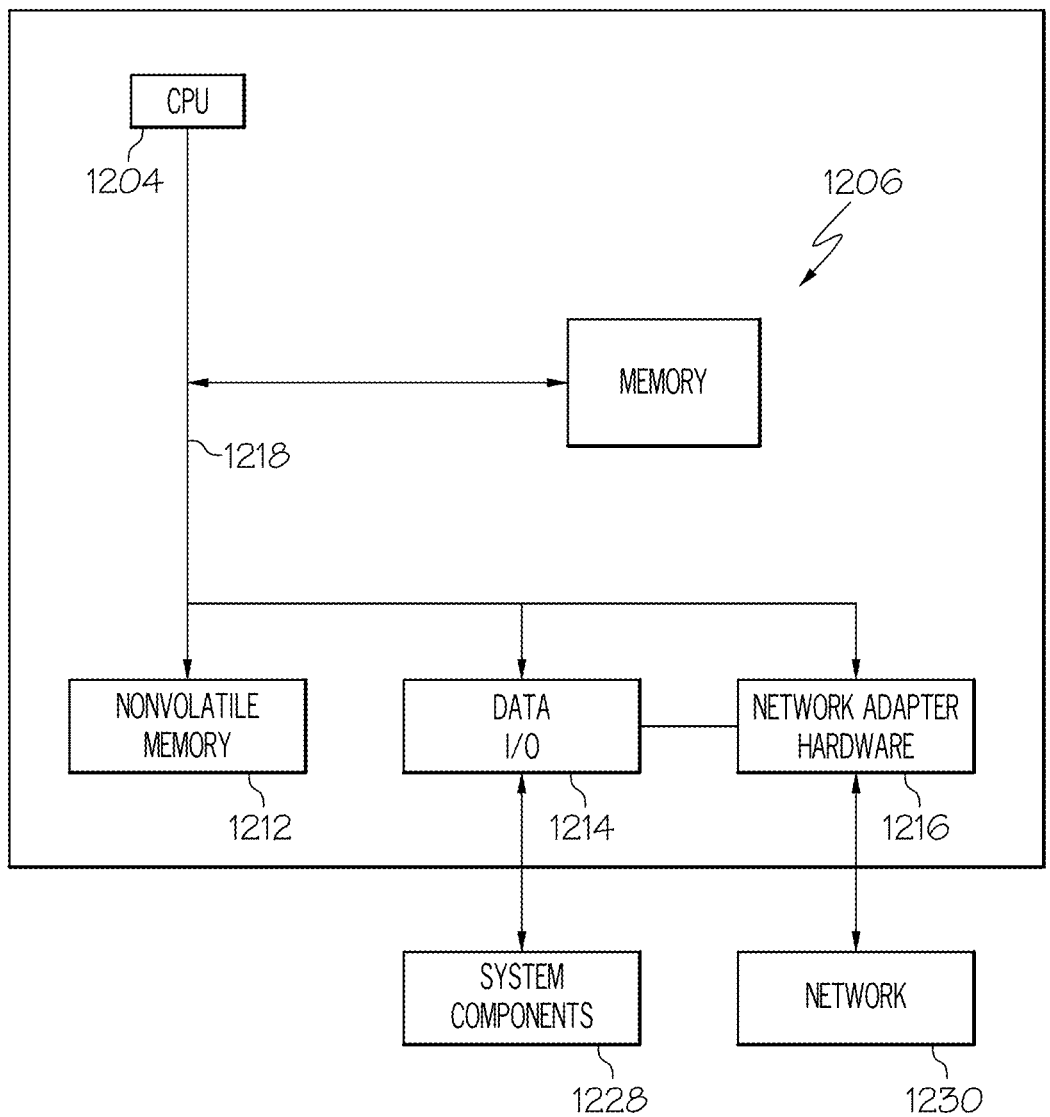
FIG. 12 illustrates a block diagram illustrating a processor, according to an example.

FIG. 12 illustrates a block diagram illustrating a processor 1200 according to an example. The processor 1200 is an example of a processing subsystem that is able to perform any of the above-described processing operations, control operations, other operations, or combinations of these.

The processor 1200 in this example includes a CPU 1204 that is communicatively connected to a main memory 1206 (e.g., volatile memory), a non-volatile memory 1212 to support processing operations. The CPU is further communicatively coupled to a network adapter hardware 1216 to support input and output communications with external computing systems such as through the illustrated network 1230.

The processor 1200 further includes a data input/output (I/O) processor 1214 that is able to be adapted to communicate with any type of equipment, such as the illustrated system components 1228. The data input/output (I/O) processor in various examples is able to be configured to support any type of data communications connections including present day analog and/or digital techniques or via a future communications mechanism. A system bus 1218 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system- or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which-when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer-readable medium allowing a computer to read data, instructions, messages or message packets, and other computer-readable information from the computer-readable medium. The computer-readable medium may include computer-readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer-readable medium may comprise computer-readable information in a transitory state medium such as a network link and/or a network interface, including a wired network or a wireless network, that allow a computer to read such computer-readable information. In general, the computer-readable medium embodies a computer program product as a computer-readable storage medium that embodies computer-readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

Although specific embodiments of the invention have been discussed, those having ordinary skill in the art will understand that changes can be made to the specific embodiments without departing from the scope of the invention. The scope of the invention is not to be restricted, therefore, to the specific embodiments, and it is intended that the appended claims cover any and all such applications, modifications, and embodiments within the scope of the present invention.

It should be noted that some features of the present invention may be used in one embodiment thereof without use of other features of the present invention. As such, the foregoing description should be considered as merely illustrative of the principles, teachings, examples, and exemplary embodiments of the present invention, and not a limitation thereof.

Also, these embodiments are only examples of the many advantageous uses of the innovative teachings herein. In general, statements made in the specification of the present application do not necessarily limit any of the various claimed inventions. Moreover, some statements may apply to some inventive features but not to others.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing an interactive energy assessment, the method comprising:
    accessing at least one image of a real-world space;
    identifying, using image recognition, at least one object related to energy consumption in the image;
    retrieving specific energy information for the at least one identified object, wherein:
        the specific energy information is real-time or historical energy consumption measured by a measuring device coupled to a plurality of parallel coupled energy consumption related objects including the at least one identified object;
        the measuring device is configured to:
            analyze energy consumption of the plurality of parallel coupled energy consumption related objects; and
            disaggregate the energy consumption of the at least one identified object;
    creating a virtual reality image or mixed reality image by combining i) at least one computer-generated indicator of specific energy information near each identified object related to energy consumption with ii) the image of the real-world space;
    receiving a user selection of one of the at least one computer-generated indicator of specific energy information;
    in response to receiving the user selection of the computer-generated indicator, presenting the specific energy information corresponding to the identified object related to energy consumption includes presenting recommendations to reduce energy consumption; and
    creating another synthetic image by combining a photorealistic image based on the recommendations with the image of the real-world space to provide a visual representation of how the recommendations will appear and where in the photorealistic image is resized to be consistent with the real-world space.

2. The method of claim 1, wherein the accessing at least one image of the real-world space includes accessing at least one of a real-world image, a virtual image and a combination thereof.

3. The method of claim 1, wherein the identifying the at least one object related to energy consumption in the image of the real-world space includes one of
    receiving input from a user labeling the object related to energy consumption in the image;
    image recognition of the object related to energy consumption in the image; or
    a combination thereof.

4. The method of claim 1, wherein the presenting the specific energy information corresponding to identified object related to energy consumption, includes presenting generic energy information from one of a manufacturer of the identified object related to energy consumption, information from third parties regarding energy consumption for a model of the identified object related to energy consumption, or a combination of both.

5. The method of claim 1, wherein the presenting the specific energy information corresponding to the identified object related to energy consumption, includes creating another synthetic image by combining the specific energy information with the image of the real-world space.

6. The method of claim 1, wherein the accessing of the image of the real-world space includes accessing one of a 2-D image, a 3-D image from LiDAR, photogrammetry stitching, or generation of a point cloud.

7. The method of claim 1, wherein the accessing of the image of the real-world space includes accessing images in an infrared frequency range to identify differences in heat.

8. The method of claim 1, further comprising:
    a second user acting as a guide to a user in the virtual reality image or mixed reality image; and
    wherein receiving the user selection of one of the computer-generated indicators of specific energy information, further includes receiving guidance for the user selection by the guide in the virtual reality image or mixed reality image.

9. The method of claim 8, wherein the second user acting as the guide appears as an avatar in the virtual reality image or mixed reality image.

10. The method of claim 9, wherein the avatar is programmatically constructed to guide the user.

11. The method of claim 1, wherein the recommendations to reduce energy consumption comprise receiving a user selection of the recommendations, and adding the user selection to a shopping basket of goods and services for purchase.

12. The method of claim 1, wherein the recommendations to reduce energy consumption further comprise one of coupons, discounts, energy rebates, partnerships, or a combination thereof for implementing the recommendations.

13. A system for performing an interactive energy assessment generating synthetic images for use in a machine learning training set, the system comprising:
    a computer memory capable of storing machine instructions; and
    a hardware processor in communication with the computer memory, the hardware processor configured to access the computer memory to execute the machine instructions for performing:
    accessing at least one image of a real-world space;
    identifying, using image recognition, at least one object related to energy consumption in the image;
        retrieving specific energy information for the at least one identified object, wherein:
            the specific energy information is real-time or historical energy consumption measured by a measuring device coupled to a plurality of parallel coupled energy consumption related objects including the at least one identified object;
            the measuring device is configured to:
                analyze energy consumption of the plurality of parallel coupled energy consumption related objects; and
                disaggregate the energy consumption of the at least one identified object;
        creating a virtual reality image or mixed reality image by combining i) at least one computer-generated indicator of specific energy information near each identified object related to energy consumption with ii) the image of the real-world space;
        receiving a user selection of one of the at least one computer-generated indicator of specific energy information;
        in response to receiving the user selection of the computer-generated indicator, presenting the specific energy information corresponding to the identified object related to energy consumption includes presenting recommendations to reduce energy consumption; and creating another synthetic image by combining a photorealistic image based on the recommendations with the image of the real-world space to provide a visual representation of how the recommendations will appear and where in the photorealistic image is resized to be consistent with the real-world space.

14. The system of claim 13, wherein the accessing at least one image of the real-world space includes accessing at least one of a real-world image, a virtual image and a combination thereof.

15. The system of claim 13, wherein the identifying the at least one object related to energy consumption in the image of the real-world space includes one of
receiving input from a user labeling the object related to energy consumption in the image;
image recognition of the object related to energy consumption in the image; or
a combination thereof.

16. The system of claim 13, wherein the presenting the specific energy information corresponding to identified object related to energy consumption, includes presenting generic energy information from one of a manufacturer of the identified object related to energy consumption, information from third parties regarding energy consumption for a model of the identified object related to energy consumption, or a combination of both.

17. The system of claim 13, wherein the presenting the specific energy information corresponding to the identified object related to energy consumption, includes creating another synthetic image by combining the specific energy information with the image of the real-world space.

18. The system of claim 13, wherein the recommendations to reduce energy consumption comprise receiving a user selection of the recommendations, and adding the user selection to a shopping basket of goods and services for purchase.

19. The system of claim 13, wherein the recommendations to reduce energy consumption further comprise one of coupons, discounts, energy rebates, partnerships, or a combination thereof for implementing the recommendations.

* * * * *